United States Patent [19]

Muse

[11] 4,020,322

[45] Apr. 26, 1977

[54] MULTI SMOKER

[76] Inventor: Edward T. Muse, 8514 Chadbourne, Dallas, Tex. 75209

[22] Filed: May 14, 1976

[21] Appl. No.: 686,299

[52] U.S. Cl. .................. 219/392; 99/448; 99/450; 99/482; 219/401; 219/408; 219/433

[51] Int. Cl.² ............................................. F27D 5/00

[58] Field of Search .......... 219/391, 392, 393, 401, 219/408, 433; 99/447, 448, 450, 482; 126/25 A

[56] References Cited

UNITED STATES PATENTS

| | | | |
|---|---|---|---|
| 1,570,778 | 1/1926 | Putman | 219/391 X |
| 2,057,741 | 10/1936 | Purpura | 219/401 X |
| 2,833,201 | 5/1958 | Simank | 99/482 X |
| 2,842,043 | 7/1958 | Reuland | 99/482 |
| 3,030,486 | 4/1962 | Lashley | 219/401 X |
| 3,333,526 | 8/1967 | Kirkpatrick | 99/482 X |
| 3,456,598 | 7/1969 | Mackay | 21/401 X |
| 3,518,949 | 7/1970 | Stock | 219/401 X |
| 3,616,748 | 11/1971 | Foreman | 99/450 |
| 3,859,505 | 1/1975 | Herbrand et al. | 219/433 |
| 3,974,760 | 8/1976 | Ellis | 99/482 |

FOREIGN PATENTS OR APPLICATIONS 563,024  7/1944  United Kingdom ................ 99/448

*Primary Examiner*—Volodymyr Y. Mayewsky
*Attorney, Agent, or Firm*—Richards, Harris & Medlock

[57] ABSTRACT

Electric commercial cooking apparatus having a cylindrical body with dome top and bottom and a vertically hinged door. The apparatus has a thermostat controlled electrical heating element affixed to the bottom dome. The heating element serves as a heat supply and to generate smoke from combustible material such as hickory chips. The heating element and tray are located beneath a water pan and a plurality of grids supported by brackets located on the interior of the body adjacent the door and opposite the door. The grids and water pan may be removed by tilting each sideways so that they may pass through the door opening for easy maintenance.

2 Claims, 4 Drawing Figures

MULTI SMOKER

The present invention relates to a cooking device, and more particularly to an electrically heated smoker used for cooking meats and other foods under moist atmospheric conditions.

Various cookers of smoke type can be found in the prior art. The advantage of moist smoker cooking is that a desirable flavor is imparted to the food without the necessity of a complicated rotisserie or manual turning since the method utilizes low or moderate heat to cook the food. Further, the juices from the meat are caught and vaporized to baste the meat to keep the meat moist and prevent dehydration. A water pan containing liquid is supported above the heating element to provide additional moisture during the cooking process. Once the meat has been placed in the cooker, the cooker can be left substantially unattended until the meat is completely done.

Cookers for the preparation of smoke flavored meat generally include a covered housing containing a grill for supporting the meat during cooking. A pan is located beneath the grill and serves to catch the drippings and if desired, a predetermined amount of water may be added to the pan to vaporize for added moisture during cooking. A heat source is located in the bottom of the housing beneath the water pan to generate the flavor imparting smoke and combustible materials such as wood chips, hickory or mesquite, are positioned near the heat source. A fuel such as charcoal is commonly used as a source of heat, but various new cookers have been designed to utilize an electrical resistance heating element to provide the heat necessary to accomplish cooking. For example, U.S. Pat. No. 3,333,526 discloses a food cooker in which an electrical resistance heating element is maintained in a spaced apart relationship from the bottom wall be means of a noncombustible insulating member. The heating element and the insulating member are secured to the bottom of the container by suitable bolts or rivets. A rack on the interior of the container supports a tray which is utilized to hold combustible wood chips.

The present invention provides a smoker of the general type disclosed above having an electrical heating element disposed near the bottom of the smoker below a tray adapted to contain smoke generating wood chips. The wood chip tray, the water pan and a plurality of grills are supported within the housing by three space columns of brackets eliminating bulky hard to clean racks. A set of integral flanged bracket units on the smoker interior provide for ease of insulation, removal and adjustability. The electrical heating element used in the present cooker is configured to yield maximum and uniform heating within the unit.

The above and other important objects and advantages of the present invention will become apparent from the following detailed description and drawings in which.

Figure 1:
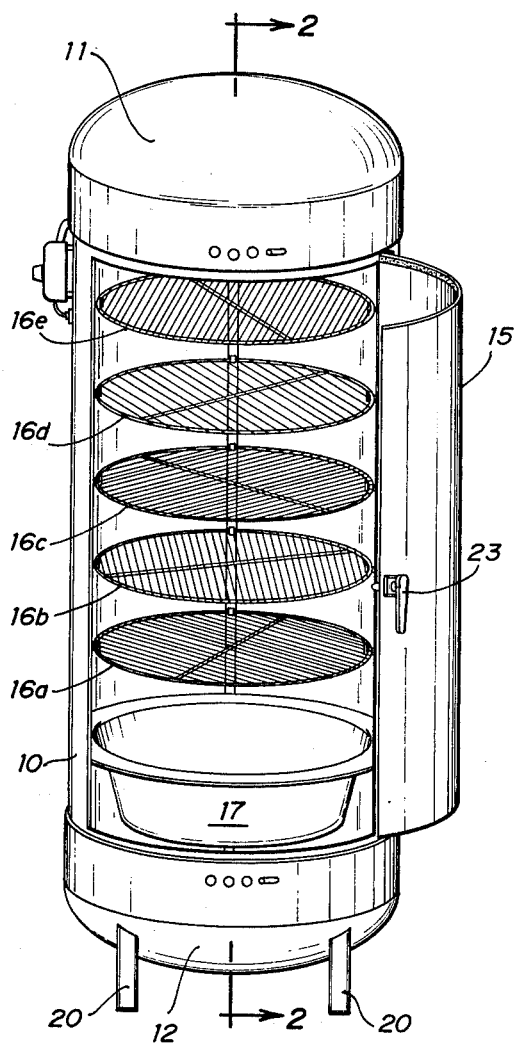
FIG. 1 illustrates the preferred embodiment of the cooking apparatus of the present invention with the door of the apparatus in an open position.
Figure 2:
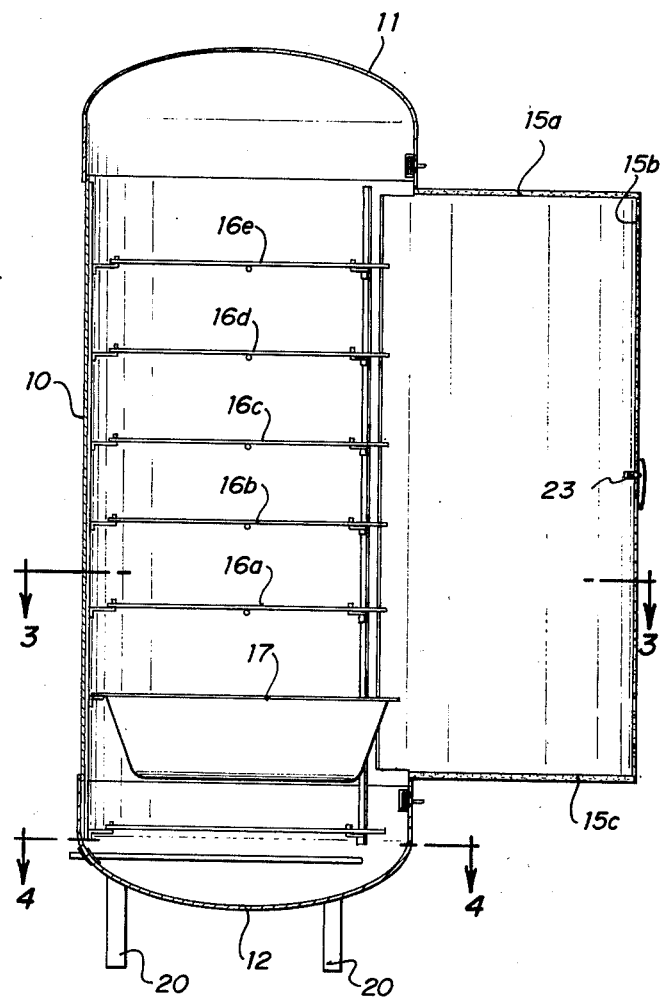
FIG. 2 is a sectional view showing the internal details of the cooker in a side elevation taken along line 2—2 of FIG. 1.
Figure 3:
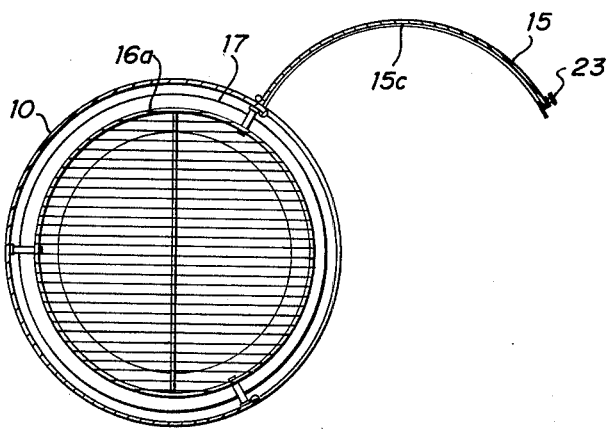
FIG. 3 is a sectional view taken along line 3—3 of FIG. 1 illustrating a top view of the grids and water pan.

Now referring to the drawings, FIGS. 1 and 2 in particular, the cooker of the present invention comprises a generally cylindrical central housing 10 having a domed top 11 and bottom 12. The top and bottom telescope with housing 10 and are permanently affixed preferably by welding. A vertically hinged door 15, having a latch 23 to secure the door when cooking, gives easy access to an array of cooking grids 16a-16e, water pan 17 and nesting tray 22. The cooker is supported by three legs 20 of rectangular tubing welded into the bottom dome 12.

In the preferred embodiment, the cooker of the present invention supports five cooking grill racks 16a-16e disposed one above the other in housing 10. The racks are supported on a plurality of bracket strips 18a-18c peripherally spaced from interior wall section 10. Bracket strips 18a-18c comprise a vertical strip 18d secured to the inner surface of housing 10. Seven brackets 18e extend horizontally radially inward from each strip 18d at spacings corresponding with the spacing of the support elements, wood tray 21, water pan 17 and racks 16a-16e. Units 18a-18c are located, one at each margin of the opening for door 15 and one directly at the rear, opposite the door opening. The brackets 18e which support the racks 16a-16e are longer than the bracket which supports pan 17 so that pan 17, larger in diameter than racks 16a-16e, will catch all drippings from the racks.

Racks 16a-16c may be inserted and removed for easy cleaning by tilting and withdrawing through door 15. The use of multiple racks such as is shown permits cooking of a large quantity of meat, as all racks can be loaded simultaneously. Racks 16a-16e are conventionally designed and preferably formed from a stainless steel or chrome plated wire which are highly heat resistant and which have a series of parallel spaced apart bars on which the food to be cooked is placed.

Bracket unit 18b is secured to extend vertically along the housing interior by welding or similar methods. Pan 17 is disposed below the lower cooking rack 16a and is arranged to catch and contain drippings. Normally pan 17 will be provided with a certain amount of water. Pan 17 has a peripheral lip 32 which rests on the next lowest set of brackets 18e. Slide dampers 23 and 24 are located immediately above and below the door opening to provide adjustable circulation through the unit. Further circulation control is provided by silicon sponge sealing strips 15a-15c secured along the inner margins of door 15.

Figure 4:
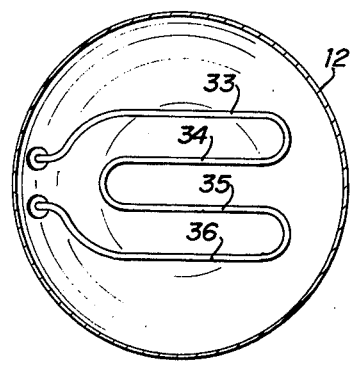
FIG. 4 is a sectional view taken along line 3—3 of FIG. 1 with grid and water pan removed showing a top view of resistance heating element and nesting tray.

Heat for cooking is obtained from a 220 volt electrical heating element 21 which is sized and selected to maintain a temperature within the cooker up to 300° F. and would typically be rated 5000 watts. Element 21 preferably is of a W shape and as seen in FIG. 4 includes four interconnected generally parallel sections 33, 34, 35 and 36. Heating element 21 is connected to a control box 13 which is controlled by thermostat 14. An insulated line cord 37 extends from the receptacle box for wiring. The electrical element described is supported at the bottom dome of the unit by suitable fasteners. Further, in accordance with the good safety practice, all wiring and electrical components are easily accessible. A wood tray 22 is supported within the cooker on the lowermost brackets 18e at an elevation above the heating element and below pan 17. Tray 22 may be of expanded metal or other material suitable to be supported on brackets 18e and of perforate material. Tray 22 is supported directly over the heating element for efficient and complete combustion of wood material placed on the tray for generation of the flavor imparting wood smoke. Removal of wood tray 22 is accomplished by tilting and lifting it out, and it is replaced in the same manner. The cooker of the present invention will be better understood from the following description of operation.

When it is desired to prepare a selected meat, such as beef roast with the hickory smoked flavor, a suitable quantity of hickory blocks or chips is placed on tray 22. For other flavors, other types of wood can be used such as mesquite or apple wood. For example, to cook several chickens will normally require several blocks of hickory to impart desirable flavor. Pan 17 is inserted into the cooker with its lip 32 supported bracket 18. The grills 16 are supported by flanges of bracket units 18a-18c. Meat to be cooked is then placed on the racks 16a-16e. Electrical heating element 21 is then energized by connecting line cord 37 to a source of electrical current. The desired temperature is then set on control box 13 and the heat will be controlled by thermostat 14. The electrical heating element heats the interior of the cooker up to 300° F. and also will cause the wood in the wood tray 22 to be heated to near the combustion point, where the mold will smoulder emitting a dense smoke which will penetrate and flavor the meat.

During the cooking, which may take four to five hours, the smoker may be left substantially unattended. There is no need for the cook to baste the meat or turn it, and in fact, it is suggested that the cooker not be opened during the cooking process inasmuch as it will result in increased cooking time. When the meat is done, it may be removed and is ready for serving immediately. If desired, the meat, after it has been completely cooked, can be left in the cooker for a long period of time, keeping it warm inasmuch as the temperature control in control box 13 is set to a low heat process.

The advantages to the use of the electrical heating element are obvious. There is no such need for the cook to charge the unit with a fuel, such as charcoal, and incur the difficulties of lighting a fire to cook the food. The unit is portable and may be used indoors or outdoors and is highly adaptable and may be used to cook a small quantity of meat or a larger quantity of meat, using any or all of the grills. The internal components are easily removable for cleaning. The wood chip containing tray is easily fillable with desired aromatic smoke producing chips and is nestable with the heating element for efficient combustion of the wood chips.

It will, therefore, be seen that the present invention provides a smoker which is highly efficient and serves to easily and effectively smoke meats and other foods with a highly desirable moist smoked cooking method. Modifications and changes to the present invention will occur to those skilled in the art, it being understood and intended that the present invention is to be limited only for interpretation of the appended claims.

What is claimed is:

1. A cooking device comprising:
    a cylindrical housing having top and bottom closures permanently affixed, said housing having a longitudinal opening of about one-third the circumference thereof extending from about said top to about said bottom supported on legs with the bottom portion in spaced relationship with the ground,
    a vertically hinged door cooperable with said housing member to close said opening,
    three bracket means each vertically oriented and mounted on the interior walls of said housing adjacent to the margins of said opening and opposite said opening,
    a water pan having a peripheral flange adapted to be removably supported by said bracket means,
    cooking racks removably supported on said brackets at elevations successively spaced above said pan,
    heating means including a resistance heating element disposed in said housing and supported from said bottom closure at an elevation above said bottom closure, said element having several spaced apart parallel sections, and
    a removable tray supported by said bracket means adapted to support smoke generating material a predetermined distance above said element.

2. The cokking device of claim 1 wherein each said bracket means comprises a unitary set of strip mounted brackets having radially inwardly extending fingers, the next lowest fingers being shorter than the rest to support a water pan larger than said racks.

* * * * *